(12) United States Patent
Tran

(10) Patent No.: US 10,986,472 B2
(45) Date of Patent: Apr. 20, 2021

(54) INTERNET SEARCH BASED BUSINESS REQUEST

(71) Applicant: Phong Tran, Melbourne, FL (US)

(72) Inventor: Phong Tran, Melbourne, FL (US)

(73) Assignee: Phong Tran, Melbourne, FL (US)

( * ) Notice: Subject to any disclaimer, the term of this patent is extended or adjusted under 35 U.S.C. 154(b) by 0 days.

(21) Appl. No.: 16/580,351

(22) Filed: Sep. 24, 2019

(65) Prior Publication Data

US 2021/0092565 A1 Mar. 25, 2021

(51) Int. Cl.
  *H04W 4/14* (2009.01)
  *G06F 16/951* (2019.01)
  *G06F 16/9038* (2019.01)
  *G06F 16/9535* (2019.01)

(52) U.S. Cl.
  CPC .......... *H04W 4/14* (2013.01); *G06F 16/9038* (2019.01); *G06F 16/951* (2019.01); *G06F 16/9535* (2019.01)

(58) Field of Classification Search
  CPC .. H04W 4/14; G06F 16/9535; G06F 16/9038; G06F 16/951
  See application file for complete search history.

(56) References Cited

U.S. PATENT DOCUMENTS

| 6,788,769 | B1 | 9/2004 | Waites |
| 8,244,566 | B1 | 8/2012 | Coley et al. |
| 8,527,357 | B1 | 9/2013 | Ganesan |
| 8,671,009 | B1 | 3/2014 | Coley et al. |
| 2006/0195540 | A1 | 8/2006 | Hamilton et al. |
| 2008/0313005 | A1 | 12/2008 | Nessland et al. |
| 2011/0054978 | A1 | 3/2011 | Mohil |
| 2011/0319075 | A1* | 12/2011 | Sharma .................... H04W 4/14 455/432.2 |
| 2016/0359628 | A1* | 12/2016 | Singh .................... H04J 3/0661 |
| 2017/0109704 | A1 | 4/2017 | Lettieri |
| 2017/0161851 | A1* | 6/2017 | Li ........................... H04W 4/14 |
| 2018/0295082 | A1* | 10/2018 | Pokharel ................. G06F 16/10 |
| 2019/0182248 | A1* | 6/2019 | Meena ............... H04L 63/0853 |
| 2019/0288979 | A1* | 9/2019 | Ritchie .............. H04L 61/1552 |
| 2020/0264008 | A1* | 8/2020 | Nallu ................. G06Q 30/0641 |

FOREIGN PATENT DOCUMENTS

GB 2365566 A 2/2002

OTHER PUBLICATIONS

Wikipedia, "SMS gateway", Jun. 5, 2019, 6 pages. (Year: 2019).*

* cited by examiner

*Primary Examiner* — Arvin Eskandarnia
*Assistant Examiner* — Chhian (Amy) Ling
(74) *Attorney, Agent, or Firm* — The Watson IP Group, PLC; Dan Fiul

(57) ABSTRACT

A device includes a transceiver and a processor. The transceiver transmits an Internet search query related to at least one product and service, receives search results related to the Internet search query, the search results including at least one business identifier associated with at least one business associated with the at least one product and service, respectively. The processor receives a user request associated with the at least one product and service, formulates at least one unique host identifier associated with the at least one business, respectively, and formulates at least one user request message including the user request and the at least one unique host identifier. The transceiver further transmits the at least one user request message.

24 Claims, 11 Drawing Sheets

SelectedForm

1050

BURNS VILLAGE

Allure Nails

Directions

Address: 1660 IE Eau Gallie Blvd Ste 105, Indian Harbour Beach, FL 32937
Phone: (321) 241-6325
Suggest an edit Open today  9:30 AM - 7:00 PM 1055
1060
1065
1070
1075

FIG. 10

INTERNET SEARCH BASED BUSINESS REQUEST

CROSS-REFERENCE TO RELATED APPLICATION

NA

BACKGROUND OF THE DISCLOSURE

1. Field of the Disclosure

The disclosure relates in general to an Internet search-based request, and more particularly, to an Internet search-based business request.

2. Background Art

The Internet has become an invaluable tool for consumers of at least one of products and services. Within seconds, consumers can search for and find local businesses within a vicinity of their wireless device, such as their cell phone. For example, a particular consumer may want to obtain salon service, such as a nail salon service, and use an Internet search engine to find nail salons within their vicinity. For example, the consumer can submit an Internet search query to Google requesting "nail salon near me". The consumer's wireless device automatically sends location information (e.g., Global Positioning System (GPS) coordinates) associated with the wireless device along with this Internet search query. Google conveniently responds to such an Internet search query with a list of nail salons within a vicinity of the wireless device. Consumers can also perform this same type of search from stationary devices, such as their personal computer. Consumers can perform this type of Internet search query for various types of local businesses providing at least one of products and services, such as hair salons, automotive repair services, automotive parts, bakeries, plumbing services, appliance repair services, and/or any other provider of goods and/or services within a local vicinity of the consumer.

SUMMARY OF THE DISCLOSURE

The disclosure is directed to a method that comprises transmitting, by a client device, an Internet search query related to at least one product and service and receiving, by the client device, search results related to the Internet search query, the search results including at least one business identifier associated with at least one business associated with the at least one product and service, respectively. The method further comprises receiving, by the client device, a user request associated with the at least one product and service and formulating, by the client device, at least one unique host identifier associated with the at least one business and including the at least one business identifier, respectively. The method yet further comprises formulating, by the client device, at least one user request message including the user request and the at least one unique host identifier and transmitting, from the client device, the at least one user request message.

In some configurations, the method further comprises formulating, by the client device, a unique client identifier associated with the client device, formulating, by the client device, the at least one user request message to further include the unique client identifier, and transmitting, from the client device, the at least one user request message further including the unique client identifier.

In some configurations, the unique client identifier is an email address that includes a phone number associated with the client device and a domain associated with a wireless carrier servicing the client device.

In some configurations, the at least one user request message is a Short Message Service (SMS) message, the method further comprises receiving, by an SMS gateway, the email response message, formulating, by the SMS gateway, an SMS response message including the user response, and transmitting, by the SMS gateway, the at least one host message to the at least one host device, respectively, via the at least one unique host identifier.

In some configurations, the method further comprises receiving, by a particular host device, the user request and the unique client identifier and receiving, by the particular host device, at least one user response associated with the user request. The method yet further comprises formulating, by the particular host device, at least one response message including the at least one user response and transmitting, by the particular host device, the at least one response message to the client device via the unique client identifier.

In some configurations, the response message is an email response message.

In some configurations, the method further comprises receiving, by an SMS gateway, the email response message, formulating, by the SMS gateway, an SMS response message including the user response, and transmitting, by the SMS gateway, the SMS response message to the client device via the unique client identifier.

In some configurations, the method further comprises accepting, by the client device, a client email address associated with the client device, formulating, by the client device, the at least one user request message further including the client email address, and transmitting, from the client device, the at least one user request message further including the client email address.

In some configurations, the method further comprises receiving, by a particular host device, the user request and the client email address and receiving, by the particular host device, at least one user response associated with the user request. The method yet further comprises formulating, by the particular host device, at least one response message including the at least one user response transmitting, by the particular host device, the at least one response message to the client device via the client email address.

In some configurations, the at least one user request message further includes a unique client identifier, the method further comprises receiving, by a cloud database, the at least one user request message including the unique client identifier and utilized to update a status field in the cloud database, receiving, by the cloud database, a user response message utilized to update the status field in the cloud database, and receiving, by the cloud database, at least one user response message utilized to update the status field, the user response being associated with a particular host. The method yet further comprises receiving, by the cloud database, a client status update utilized to update the status field, the client status update associated with the client device, updating, by the cloud database, the status field in response to the cloud database receiving at least one of the at least one user request message, the at least one user response message, and the client status update, the status indicating one of a pending user request, an acceptance by the particular host of the user request, a confirmation of that the client device desires the user request, and a cancellation by the client device of the user request, and transmitting, by the cloud database, notification of any updates of the status field to the client device and at least one host device associated with the at least one unique host identifier, respectively.

In some configurations, the cloud database is Google Firebase.

In some configurations, the at least one unique host identifier is an email address that includes at least one of a business name, a business address, a business phone number, and a same domain associated with a plurality of the at least one host device.

The disclosure is also directed to a device that comprises a transceiver and a processor. The transceiver transmits an Internet search query related to at least one product and service, receives search results related to the Internet search query, the search results including at least one business identifier associated with at least one business associated with the at least one product and service, respectively. The processor receives a user request associated with the at least one product and service, formulates at least one unique host identifier associated with the at least one business and including the at least one business identifier, respectively, and formulates at least one user request message including the user request and the at least one unique host identifier. The transceiver further transmits the at least one user request message.

In some configurations, the processor further formulates a unique client identifier associated with the client device and formulates the at least one user request message to further include the unique client identifier and the transceivers further transmits the at least one user request message further including the unique client identifier.

In some configurations, the unique client identifier is an email address that includes a phone number associated with the client device and a domain associated with a wireless carrier servicing the client device.

In some configurations, the at least one user request message is an SMS message and a system includes the device, the system further comprising an SMS gateway to receive the at least one user request message, formulate at least one host message including the user request and the unique client identifier, and transmit the at least one host message to the at least one host device, respectively, via the at least one unique host identifier.

In some configurations, a system includes the device, the system further comprising a particular host device to receive the user request and the unique client identifier, receive at least one user response associated with the user request, formulate at least one response message including the at least one user response, and transmit the at least one response message to the client device via the unique client identifier.

In some configurations, the response message is an email response message.

In some configurations, the system further comprises an SMS gateway to receive the email response message, to formulate an SMS response message including the user response, and transmit the SMS response message to the client device via the unique client identifier.

In some configurations, the processor further accepts a client email address associated with the client device, formulates the at least one user request message further including the client email address, and the transceiver further transmits the at least one user request message further including the client email address.

In some configurations, a system includes the device, the system further comprising a particular host device to receive the user request and the client email address, receive at least one user response associated with the user request, formulate at least one response message including the at least one user response, and transmit, via client email address, the at least one response message to the client device via the client email address.

In some configurations, a system includes the device, the at least one user request message further includes a unique client identifier, the system further comprises a cloud database to receive the at least one user request message including the unique client identifier and utilized to update a status field in the cloud database, receive a user response message utilized to update the status field in the cloud database, receive at least one user response message utilized to update the status field, the user response being associated with a particular host, receive a client status update utilized to update the status field, the client status update associated with the client device, update the status field in response to the cloud database receiving at least one of the at least one user request message, the at least one user response message, and the client status update, the status indicating one of a pending user request, an acceptance by the particular host of the user request, a confirmation of that the client device desires the user request, and a cancellation by the client device of the user request, and transmit notification of any updates of the status field to the client device and at least one host device associated with the at least one unique host identifier, respectively.

In some configurations, the cloud database is Google Firebase.

In some configurations, the at least one unique host identifier is an email address that includes at least one of a business name, a business address, a business phone number, and a same domain associated with a plurality of the at least one host device.

BRIEF DESCRIPTION OF THE DRAWINGS

The disclosure will now be described with reference to the drawings wherein:

FIG. 10 illustrates an exemplary GUI for displaying information for the business selected on the GUI shown in FIG. 9, in accordance with at least one embodiment disclosed herein.

DETAILED DESCRIPTION OF THE DISCLOSURE

Figure 1:
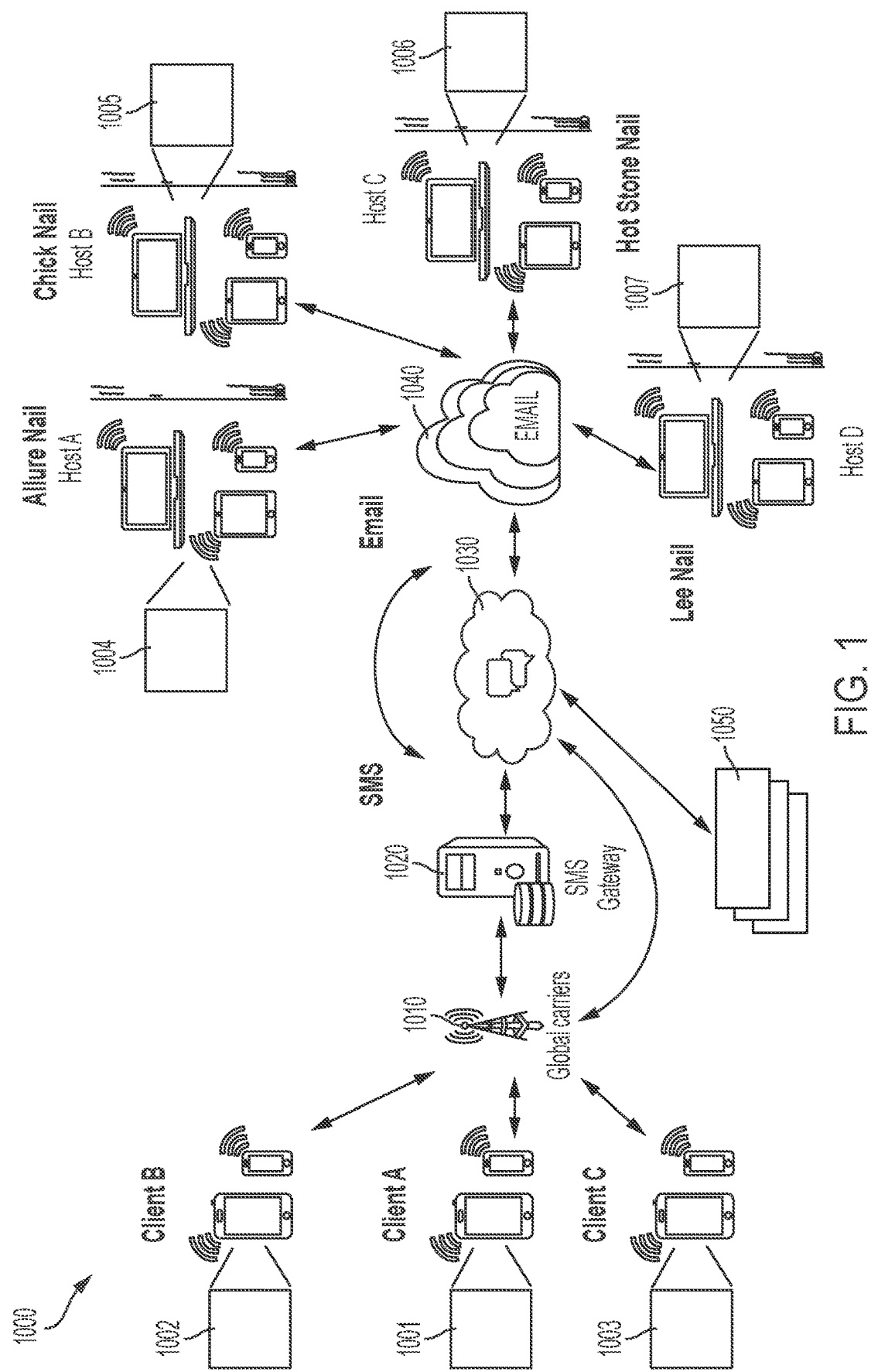
FIG. 1 illustrates an example system including a plurality of devices, in accordance with the embodiments disclosed herein.

While this disclosure is susceptible of embodiment(s) in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

A deficiency within the art of obtaining goods and/or services within a local vicinity of the consumer includes having to contact each business individually should the consumer have any questions related to the goods and/or services provided by the local business. In furtherance to the example above, once the consumer performs an Internet search query for "nail salons near me" the consumer is provided with a list of local businesses. The Internet provides some information about the types of goods and/or services that those businesses provide, but cannot provide detailed information for every particular type of goods and/or services that those businesses provide. In this example, the consumer can desire a particular nail service, e.g., a pedicure, that only some salons offer. In addition, for that particular nail service, some salons may only have a single technician performing that particular nail service. Presently, the consumer can call each business individually to query the business about particular goods and/or services, and even if that business offers those particular goods and/or services if a person is available to assist the consumer with those particular goods and/or services. Calling each business individually with questions about those particular goods and/or services is time consuming for both the customer and the business owner. The embodiments disclosed herein address such a deficiency within the art.

Referring now to the drawings and in particular to FIG. 1, an embodiment is disclosed that includes a system 1000 illustrated as including a plurality of devices, such as a plurality of client devices Clients A-C that can be in wireless communication with a wireless communication network, such as cellular global carriers 1010. In this embodiment, the Clients A-C can be any wireless communication device that is capable of transmitting and receiving Short Messaging Service (SMS) messages, such as cell phones, tablets, smart watches, or any other wireless communication device with the ability to transmit and receive SMS response messages. Although three Clients A-C are shown, the system 1000 can include any number of Clients. The cellular global carriers 1010 can be in communication with an SMS gateway 1020, the SMS gateway 1020 also being in communication with a wide area network (WAN) 1030, such as the Internet, or other networks. In communication with the WAN 1030 are at least one email server 1040, e.g., an email server associated with a wireless carrier, the at least one email server 1040 also being in communication with a plurality of host devices, such as Hosts A-D. In this embodiment, the Hosts A-D can be any communication device that is capable of transmitting and receiving email messages, such as cell phones, tablets, smart watches, personal computers, or any other communication device with the ability to transmit and receive email messages. The WAN 1030 can also be in communication with at least one search engine 1050 (servers), such as Google, Yahoo, Bing, Ask, etc.

Although four Hosts A-D are shown, the system 1000 can include any number of Hosts. In the example shown, Host A corresponds to a nail salon business entitled "Allure Nail", Host B corresponds to a nail salon business entitled "Chick Nail", Host C corresponds to a business entitled "Hot Stone Nail", and Host D corresponds to a nail salon business entitled "Lee Nail". Although nail salons business are illustrated in FIG. 1, in accordance with the embodiments disclosed the Hosts A-D can correspond to any type of business providing at least one of products and services, such as hair salons, automotive repair services, automotive parts, bakeries, plumbing services, appliance repair services, and/or any other provider of at least one of products and services within a local vicinity of the consumer. In this way, the Clients A-C can search for at least one of products and services anywhere they happen to be while needing those at least one of products and services from any of Hosts A-D.

The Clients A-C can each execute software applications 1001, 1002, 1003, respectively, the software applications 1001, 1002, 1003 operating in coordination with software applications 1004, 1005, 1006, 1007 that each of the Hosts A-D can execute, respectively. At least one of the Clients A-C can accept a user Internet search query from a user operating the Clients A-C, via the software applications 1001, 1002, 1003, such as via a GUI. For example, a user of any of the Clients A-C can utilize a keyboard, such as a virtual keyboard or physical keyboard, to enter their Internet search query into a GUI that includes an Internet search query box provided by the software applications, 1001, 1002, 1003, respectively. The Clients A-C can then transmit this Internet search query related to a specific at least one product and service. The Internet search query can be communicated to the at least one search engine 1050, via the WAN 1030. In at least one embodiment, the software applications 1001, 1002, 1003 can present to a user of the Clients A-C a list of categories of at least one of products and services, with the user then selecting a particular at least one of products and services that the user desires a list of local businesses that provide that particular at least one of products and services. In other embodiments, the software applications 1001, 1002, 1003 can present to users of the Clients A-C with a GUI that includes a search query box in which the users can enter a keyword, such as "nail salons", as a basis to formulate the Internet search query.

The Clients A-C can automatically attach to this Internet search query location information related to the Clients A-C, such as current GPS coordinates of the Clients A-C. In at least one other embodiment, users of the software applications 1001, 1002, 1003 are presented with an option to designated a location for their query, such as providing a city or zip code for the query. In this way, a user can search for businesses within a vicinity of a different location, outside a vicinity of their current location.

In this example, any of the Clients A-C can formulate an Internet search query for the nail salons within their vicinity, via the software applications 1001, 1002, 1003, respectively. In at least one embodiment, the software applications 1001, 1002, 1003 can provide a user with a GUI that includes a user option to adjust this vicinity, for example businesses within 5 miles, within 10 miles, within 15 miles, etc. In response to this Internet search query, the at least one search engine 1050 can formulate a list of nail salons within a current vicinity of the Clients A-C, respectively. The at least one search engine 1050 can transmit and at least one of the Clients A-C can receive the search results related to this Internet search query, as formulated by the at least one search engine 1050. In the example shown, at least one of the Clients A-C can receive a list of nail salons within their vicinity, e.g., Allure Nail, Chick Nail, Host Stone Nail, and Lee Nail. In at least one embodiment, at least one search engine 1050 can transmit and at least one of the Clients A-C can additionally receive advertising related to these search results.

Now that users of at least one of the Clients A-C know what nail salons are within their vicinity, the users of the Clients A-C want to know if these businesses can provide at least one specific product and service. For example, a user may want to know if any of the nail salons, Allure Nail, Chick Nail, Host Stone Nail, and Lee Nail, within their vicinity are able to perform a pedicure. The Clients A-C, via the software applications 1001, 1002, 1003, respectively, can provide a user with a GUI that includes a data entry box within which the user can enter their user request associated with the at least one product and service, such as "Does your business offer pedicures". In at least one embodiment, the user can enter multiple user requests on a GUI, such as additionally "If so, do you have any openings this afternoon?". In at least one alternate embodiment, the user can select on a GUI a user request from a list of pre-defined user requests, such as selecting a selection button or selection box next to the "pedicure" procedure. Thus, the Clients A-C receive a user request associated with at least one product and service. The Clients A-C can then send this user request to at least one of the Hosts A-D, to be received via the software applications 1004, 1005, 1006, 1007, respectively, via at least one user request message. For example, the at least one user request message can include the user request and additional data overhead, such as a header or any other information needed to transmit the user request. In at least one embodiment, the software applications 1004, 1005, 1006, 1007 are email applications, such as Microsoft Outlook.

To be able to communication with one another, the Clients A-C can formulate identifiers for themselves, respectively, and for the Hosts A-D. For example, the Clients A-C can formulate unique client identifiers, respectively, and formulate unique host identifiers. Without requiring user input and details of which are hidden from the users of the Clients A-C, via the software applications 1001, 1002, 1003, can automatically formulate at least one unique host identifier associated with at least one business providing the at least one product and service, respectively, from the information gathered from the Internet search query discussed above. This at least one unique host identifier is further associated with at least one Host, e.g., at least one of the Hosts A-D, respectively. Each such business can have a unique host identifier formulated for it, such that a user request can be sent to each of the businesses. These unique host identifiers are used to "address" the user request to the particular Hosts A-D such that the WAN 1030 can route the user request to the proper one or more of the Hosts A-D, as will be discussed in more detail below. The software applications 1001, 1002, 1003 can utilize an algorithm to arrange whole or particle information obtained from the Internet search query discussed above to formulate the unique host identifier. In this way, users of the Clients A-C can send their user request to at least one of the Hosts A-D without the user having to know how to "address" their user request to at least one particular Host. The software applications 1001, 1002, 1003 can all use this same algorithm so that all of the software applications 1001, 1002, 1003 are formulating the unique Host identifiers the same way. Thus, all of the software applications 1001, 1002, 1003 can formulate the same unique Host identifiers for the Hosts A-D, respectively.

Table 1 illustrates example search results obtained from Google when searching for nail salons, along with example unique host identifiers formulated by the software applications 1001, 1002, 1003. The search results include various types of unique information or business identifiers associated with a plurality of businesses, with the software applications 1001, 1002, 1003 extracting at least one business identifier from the search results and formulating the at least one unique host identifier (e.g., business name, business address, business phone number, etc.) from this unique business identifiers associated with at least one business associated with the at least one product and service, respectively. For example, the business "Allure Nails" can include at least one of the business identifier "Allure Nails" which is the name of the business, the business identifier "660 E Eau Gallie Blvd" which is the address for the business, and the business identifier "3212415813" which is the telephone for the business.

TABLE 1

| Search Result from Google | If Use Name for HOSTID | If Use Address for HOSTID | If Use Phone # for HOSTID |
|---|---|---|---|
| Allure Nails<br>4.7 ★★★★*(72) - Nail salon<br>660 E Eau Gallie Blvd<br>(321) 241-6325 | Allure Nails | 660 E Eau Gallie Blvd | 3212415813 |
| Chic Nails<br>4.4 ★★★★*(40) - Nail salon<br>1875 S Patrick Dr<br>(321) 775-3813 | Chick Nails | 1875 S Patrick Dr | 3217753813 |
| Hot Stone Nails & spa<br>4.7 ★★★★*(21) - Nail salon<br>836 E Eau Gallie Blvd<br>(321) 426-7165 | Hot Stone Nails & Spa | 836 E Eau Gallie Blvd | 3214267165 |
| Lee Nails & Spa<br>4.4 ★★★★*(65) - Nail salon<br>Indian Harbour Place<br>Shopping Center<br>224 E Eau Gallie Blvd<br>(321) 777-7733 | Lee Nails & Spa | 224 Eau Gallie Blvd | 3217777733 |

Likewise, without requiring user input and details of which are hidden from the users of the Clients A-C, Clients A-C, via the software applications 1001, 1002, 1003, can formulate a unique client identifier associated with each of the Clients A-C, respectively. Thus, each such Clients A-C can each formulate a unique client identifier for themselves, such that a user response, discussed below in more below, to the user request can be sent to each of the Clients A-C, respectively. In at least one embodiment, the unique client identifier is an email address that includes a phone number associated with the particular client device and a domain associated with a wireless carrier servicing this particular client device. The software applications 1001, 1002, 1003 can acquire phone numbers associated with the Clients A-C from the Clients A-C, respectively, e.g., from the Clients A-C. In another at least one embodiment, the unique client identifier is an email address that includes that includes at least one of a business name, a business address, a business phone number, and a same domain associated with a plurality of the Hosts A-D. For example, all of the Hosts A-D can use the same domain "TranSearchServices.com".

Table 2 provides example phone numbers, wireless carriers, and a unique email address formulated by the Clients A-C, respectively. In at least one embodiment, the software applications 1001, 1002, 1003 utilize a third-party Application Programming Interface (API) library to obtain the Client's phone number and the Client's carrier SMS gateway, which are them used to formulate the unique email addresses for the Clients A-C.

TABLE 2

| User Name | User Phone # | User Phone's Carrier | CLIENT's E-Mail formed by software |
|---|---|---|---|
| CLIENT A | 5857200000 | AT&T | 5857200000@txt.att.net (SMS) |
|  |  |  | 5857200000@mms.att.net (MMS) |
| CLIENT B | 3211234567 | Verizon | 3211234567@vtext.com (SMS) |
|  |  |  | 3211234567@vzwpix.com (MMS) |
| CLIENT C | 7272561234 | T-Mobile | 7272561234@tmomail.net (MMS) |

Once the unique host identifiers are formulated and the unique client identifier is formulated, the software applications 1001, 1002, 1003 can transmit the user request to the Hosts A-D. A single user request can be transmitted to at least one of the Hosts A-D within their vicinity or within a vicinity of a designated location, as discussed above. The Clients A-C can, via the software applications 1001, 1002, 1003, formulate the at least one user request message including the user request discussed above, the at least one unique host identifier discussed above, and the unique client identifier associated with one of the Clients A-C discussed above. In instances where a single request message will be transmitted to multiple Hosts, e.g., two or more of the Hosts A-D, the user request message can include the user request, multiple unique host identifiers, and the unique client identifier.

In at least one embodiment, the user request message is an SMS request message. The Clients A-C can then transmit this SMS user request message. In this embodiment, the SMS gateway 1020 can receive this SMS user request message and formulate at least one host message including the user request and the unique client identifier. In at least one embodiment, the at least one host message is an email message. The SMS gateway 1020 can transmit the at least one host message utilizing the unique host identifiers, such as those discussed above. The SMS gateway 1020 can transmit the at least one email host message to at least one of the Hosts A-D via the unique host identifiers associated with the Hosts A-D, respectively, that are received by the SMS gateway 1020. The at least one email host message is transmitted to at least one of the Hosts A-D via the at least one email server 1040.

The Hosts A-D can receive these email messages, respectively, including the user request and the unique client identifier. For example, Host A can receive an email message addressed to Host A via a unique host identifier associated with Host A. The Hosts A-D, via the software applications 1004, 1005, 1006, 1007, respectively, can present the user request to users of the Hosts A-D. The Hosts A-D, via the software applications 1004, 1005, 1006, 1007, respectively, can receive user responses from users of the Hosts A-D. The Hosts A-D, via the software applications 1004, 1005, 1006, 1007, respectively, can further transmit these user responses back to a particular Client, e.g., any of Clients A-C, that originally transmitted the user request based on the received unique client identifier. For example, the Hosts A-D can utilize the formulated emails associated with and received from the Clients A-C, respectively, to send an email response message including at least one user response back to at least one of the Clients A-C that originally sent a user request, respectively. The user responses can include an indication from at least one of the Hosts A-D that the Hosts A-D can service the user request. For example, at least one of the Hosts A-D can transmit a user response message including the user response that at least one of the Hosts A-D can service the request for a pedicure, respectively, in continuance of the example discussed above. For example, the user response message can include the user response and additional data overhead, such as a header or any other information needed to transmit the user response.

For example, Host A can receive a user request from Client C. Host A can present the received user request to a user of the Host A, such as on a display of the Host A. The Host A can receive at least one user response to the user request. For example, the user response can include text such as "Yes, we can perform the pedicure". In at least one embodiment, multiple user responses can be received by a particular Host, such as additionally "we have an opening at 3 pm this afternoon". The Host A can then transmit this response(s) back to the particular client, Client C in this example, based on the received unique client identifier received with the user request, a unique client identifier associated with Client C in this example. In an alternate embodiment, Host A can select from a list of pre-define responses, with at least one of the pre-define responses being sent back to Client C.

The SMS gateway 1020 can receive, via the at least one email server 1040, the email response message discussed above and can further formulate an SMS response message including the user response from this received email response message. The SMS gateway 1020 can then transmit the SMS response message to the client device that originally sent a user request, via the unique client identifier associated with the Client A-C, respectively. For example, Client A can transmit a user request message including a unique client identifier of 5857200000@txt.att.net which can be used by any of the Hosts A-D to respond to the user request. Then the SMS gateway 1020 can transmit the SMS response message to Client A using the phone number 5857200000.

Figure 2:
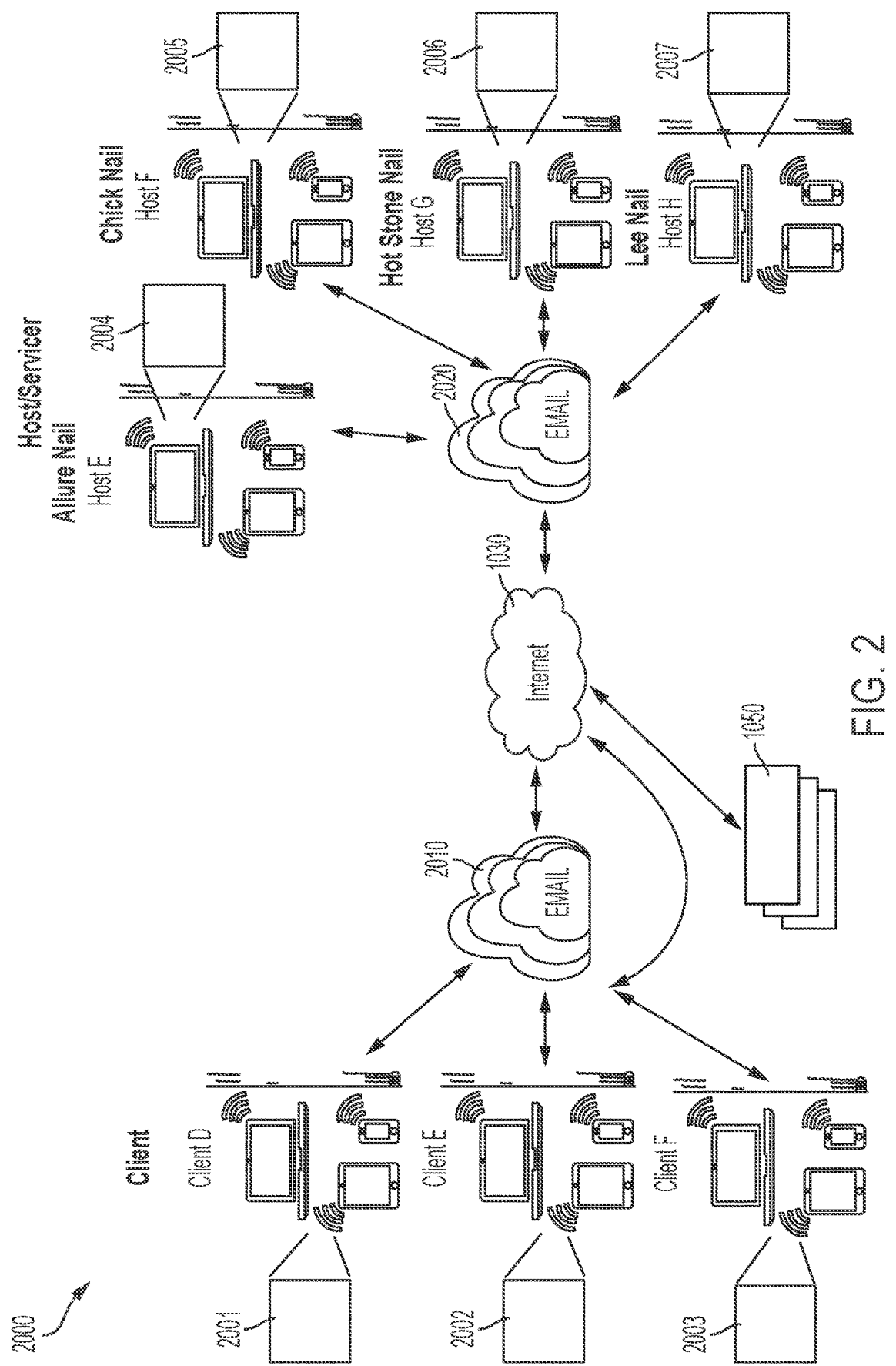
FIG. 2 illustrates another example system including another plurality of devices, in accordance with the embodiments disclosed herein.

With reference to FIG. 2, an embodiment is disclosed that includes another system 2000 illustrated as including a plurality of devices, such as a plurality of client devices, e.g., Clients D-F, that can be in communication with at least one email server, such as at least one first email server 2010. In this embodiment, the Clients D-F can be any communication device that is capable of transmitting and receiving email messages, such as cell phones, tablets, smart watches, person computers, or any other communication device with the ability to transmit and receive email messages. Although three Clients D-F are shown, the system 2000 can include any number of Clients. The at least one first email server 2010 can be in communication with the WAN 1030, the WAN 1030 can also be in communication with at least one second email server 2020. The first at least one first email server 2010 can be an email server(s) that provides email services for the Clients D-F, dependent upon a domain associated with the Clients D-F, respectively, and the second at least one email server 2020 can be an email server(s) that provides email services for host device, e.g., Hosts E-H, dependent upon a domain associated with the Clients D-F, respectively. In this embodiment, the Hosts E-H can be any communication device that is capable of transmitting and receiving email response messages, such as cell phones, tablets, smart watches, personal computers, or any other communication device with the ability to transmit and receive email messages. The WAN 1030 can also be in communication with the at least one search engines 1050.

The Hosts E-H can be in communication with the second at least one email server 2020. Although four Hosts E-H are shown, the system 2000 can include any number of Hosts. In the example shown, Host E corresponds to a nail salon business again entitled "Allure Nail", Host F corresponds to a nail salon business again entitled "Chick Nail", Host G corresponds to a business again entitled "Hot Stone Nail", and Host H corresponds to a nail salon business again entitled "Lee Nail". Although nail salons business are illustrated in FIG. 2, again in accordance with the embodiments disclosed the Host can correspond to any type of business providing at least one of products and services, such as hair salons, automotive repair services, automotive parts, bakeries, plumbing services, appliance repair services, and/or any other provider of at least one of products and services within a local vicinity of the consumer. In this way, the Clients D-F can search for at least one of products and services anywhere they happen to be while needing those at least one of products and services from any of Hosts E-H.

The Clients D-F can each execute software applications 2001, 2002, 2003, respectively, the software applications 2001, 2002, 2003 operating in coordination with software applications 2004, 2005, 2006, 2007 that each of the Hosts E-H can execute, respectively. In at least one embodiment, the software applications 2004, 2005, 2006, 2007 are email applications, such as Microsoft Outlook. The Clients D-F can formulate an Internet search query, transmit the Internet search query, receive search results from the at least one search engine 1050, formulate a user request, and formulate the unique host identifiers, as discussed above for Clients A-C.

In accordance with the at least one embodiment of FIG. 2, instead of utilizing the formulated unique client identifiers for themselves as is discussed for Clients A-C, the Clients D-F can utilize a user supplied email address as a unique identifier for themselves. In at least one other embodiment, the Clients D-F can utilize a third-party API library to automatically obtain an email address associated with the Clients D-F, respectively, with user permission. For example, the software applications 2001, 2002, 2003, can present a user of such devices with a GUI that includes a data entry box within which the user can enter a unique client email address with which the software applications 2004, 2005, 2006, 2007 can accept and utilize to have an email response message transmitted back to the Clients D-F, as discussed above. In accordance with at least one embodiment of FIG. 2, the Clients D-F can formulate and transmit, via the software applications 2001, 2002, 2003, respectively, a user request message including this user supplied unique client email address instead of the formulated email address of the at least one embodiment of FIG. 1.

The Hosts E-H can receive this email user request message including this user supplied unique client email address. The Hosts E-H can formulate and transmit, via the software applications 2004, 2005, 2006, 2007, an email response message back to the particular one of the Clients D-F that transmitted the email user request message, via this user supplied unique client email address. Thus, within the embodiment of system 2000 the Clients D-F and Hosts E-H can utilize emails on both ends of the communications between the Clients D-F and Hosts E-H, this in contrast to the embodiment of system 1000 in which Clients A-C utilize SMS messages for communications and Hosts D-G utilize email messages for communications.

Figure 3:
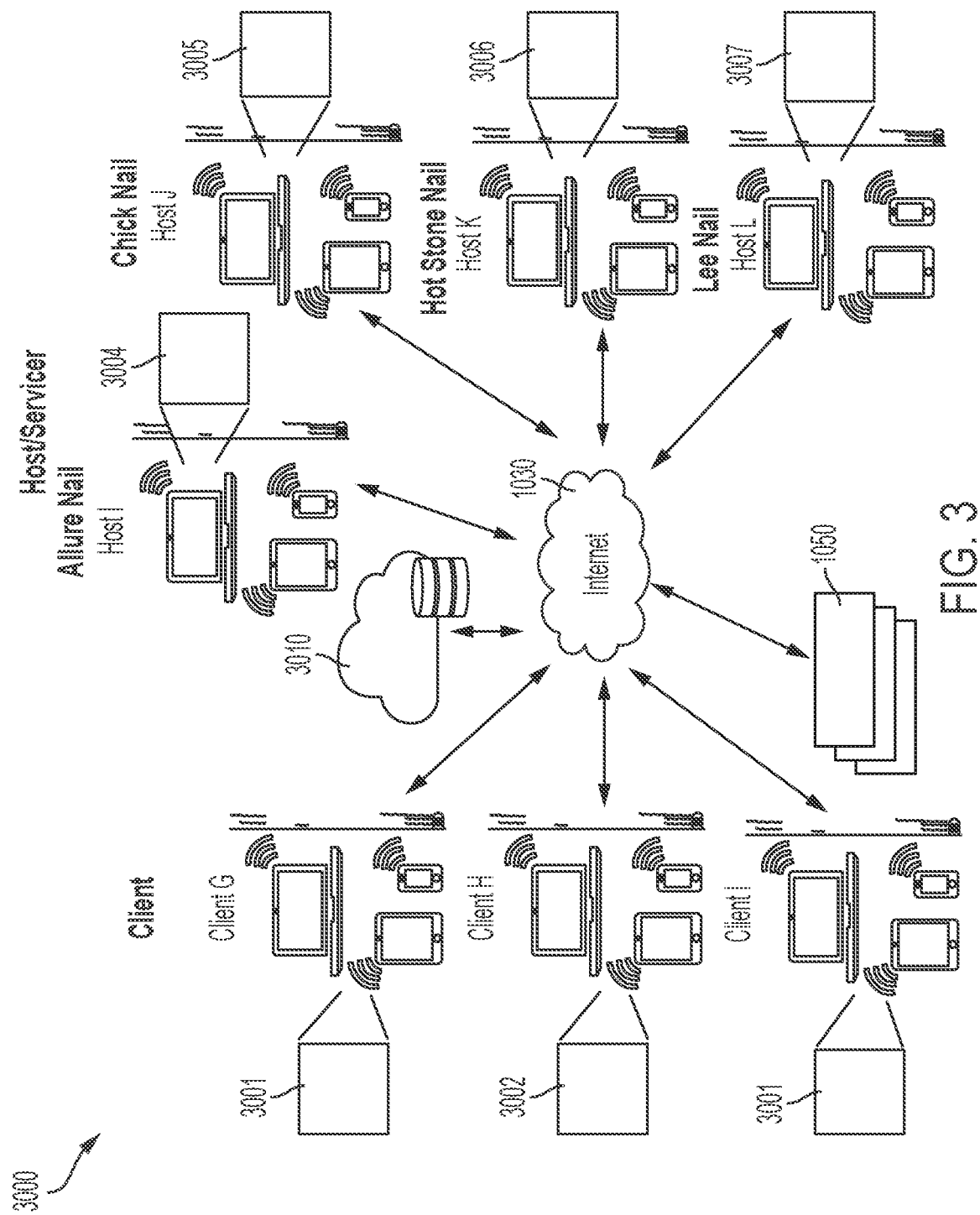
FIG. 3 illustrates yet another example system including yet another plurality of devices, in accordance with the embodiments disclosed herein.

With reference to FIG. 3, at least one embodiment is disclosed that includes yet another system 3000 illustrated as including a plurality of devices, such as a plurality of client devices Clients G-I that can be in communication with WAN 1030. The Clients G-I can be any communication device that is capable of transmitting and receiving database messages, such as cell phones, tablets, smart watches, person computers, or any other communication device with the ability to transmit and receive database messages. Although three Clients G-I are shown, the system 2000 can include any number of Clients. The WAN 1030 can also be in communication with the at least one search engines 1050.

The system 300 can further include a cloud database 3010, the cloud database 3010 (e.g., Google Firebase) can be in communication with the WAN 1030, with the client devices, e.g., Clients G-I, and host devices, e.g., Hosts I-L, being in communication with the cloud database 3010 via the WAN 1030. Although four Hosts I-L are shown, the system 3000 can include any number of Hosts. In the example shown, Host I corresponds to a nail salon business again entitled "Allure Nail", Host J corresponds to a nail salon business again entitled "Chick Nail", Host K corresponds to a business again entitled "Hot Stone Nail", and Host L corresponds to a nail salon business again entitled "Lee Nail". Although nail salons business are illustrated in FIG. 3, again in accordance with the embodiments disclosed the Hosts I-L can correspond to any type of business providing at least one of products and services, such as hair salons, automotive repair services, automotive parts, bakeries, plumbing services, appliance repair services, and/or any other provider of at least one of products and services within a local vicinity of the consumer. In this way, the Clients G-I can search for at least one of products and services anywhere they happen to be while needing those at least one of products and services from any of Hosts I-L.

The Clients G-I can each execute software applications 3001, 3002, 3003, respectively, the software applications 3001, 3002, 3003 operating in coordination with software applications 3004, 3005, 3006, 3007 that each of the Hosts I-L can execute, respectively. The Clients G-I can formulate an Internet search query, transmit the Internet search query, receive search results from the at least one search engine 1050, formulate a user request, and formulate the unique host identifiers, as discussed above for Clients A-F.

In accordance with at least one embodiment of FIG. 3, instead of utilizing SMS messages/email messages as disclosed above for system 1000 and instead of utilizing email messages as disclosed above for system 2000, the at least one embodiment of system 3000 utilizes database messages, with the Clients G-I and the Hosts I-L transmitting and receiving database messages to update and receive updates from the cloud database 3010, respectively.

In at least one embodiment of FIG. 3, the Clients G-I can transmit via the software applications 3001, 3002, 3003 the user request message discussed above instead to the cloud database 3010, with the Hosts I-L receiving notification from the cloud database 3010 when a status field associated with the user request has been newly written to or updated, via the software applications 3004-3007, respectively. Likewise, the Hosts I-L can transmit the user response message discussed above instead to the cloud database 3010, with the Clients G-I receiving notification from the cloud database 3010 when the status field associated with the user response has been newly written to or updated, via the software applications 3001, 3002, 3003, respectively. Thus, the cloud database 3010 can receive the user request messages discussed above and user response messages discussed above, both utilized by the cloud database 3010 to update the status field within the cloud database 3010.

In accordance with at least one embodiment, each database record in the cloud database 3010 can have at least three fields. These fields can include HOSTID, CLIENTID, and STATUS. The HOSTID field can be utilized by the Hosts I-L which can compare this field with a locally stored Host identifier to determine if a particular message belongs to that particular Host. The CLIENTID field can be utilized by the Clients G-I which can compare this field with a locally stored Client identifier to determine if a particular message belongs to that particular Client. The STATUS field can be utilized to mark a state of a message. Table 3 shows four example statuses, along with a purpose and a direction for each status state.

TABLE 3

| STATUS | DIRECTION | PURPOSE |
| --- | --- | --- |
| NEW | CLIENT send to HOST | User Request for service and/or product |
| ACCEPT | HOST send to Client | Accept the CLIENT user request |
| CONFIRM | CLIENT send to HOST | To confirm that the client wants their specific service |
| CANCEL | Send from CLIENT or HOST | Cancel their acceptance of service |

As discussed above, the Clients G-I can initiate the user request message, as described for Clients A-F. The Clients G-I can utilize the host identifier discussed above, and the Hosts A-L can utilize the client identifier discussed above. The Clients G-I can formulate the host identifier, as discussed above for Clients A-F.

In at least one embodiment, the software applications 1004-1007, 2004-2007, 3004-3007 are software components within a software package, such as an appointment manager software package, that allows the businesses discussed herein to make, cancel, and track appointments, such as those generated via the software applications 1001-1003, 2001-2003, 3001-3003 once a user has confirmed that they want a specific at least one product and service. In at least one embodiment, the software applications 1004, 1005, 1006, 1007 are software components within a Point of Sale (POS) terminal.

Figure 4:
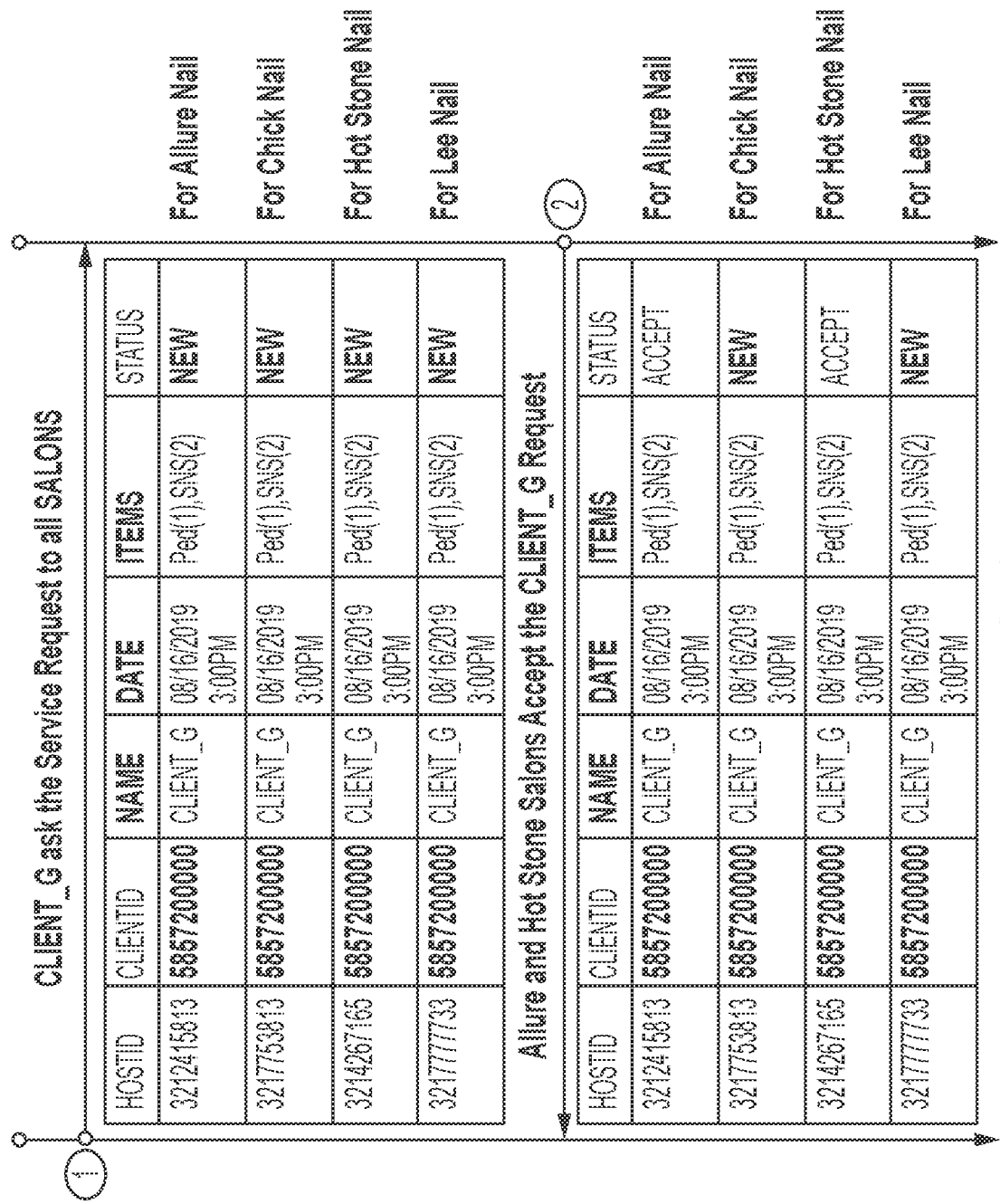
FIG. 4 illustrates example fields within a cloud database, in accordance with at least one embodiment disclosed herein.

With reference to FIG. 4, example fields within the cloud database 3010 for a particular Client, e.g., Client G shown in FIG. 3, and particular Hosts, e.g., Hosts I-L shown in FIG. 3, are illustrated. In this example, the fields within the cloud database 3010 include a HOSTID field, a CLIENTID field, a NAME field, a DATE field, an ITEMS field, and a STATUS field. For example, Client G can "broadcast" a user request message, shown as communication "1", to the cloud database 3010. This user request message can set a STATUS field to NEW for Hosts I-L, "Allure Nail", "Chick Nail", "Hot Stone Nail", and "Lee Nail", respectively, as shown. This user request message further includes the host identifiers of "3212415813", "3127753813", "3214267165", and "3217777733" for Hosts I-L, respectively, and a name of the Client transmitting the user request, in this example Client G. The cloud database 3010 records a time at which the user request message was received, "09/16/2019 3:00 PM" in this example. The particular items being requested are stored in the ITEMS field, in this example a particular user, via Client G, is requesting a "Ped(1)" and "SNS (2)", corresponding to a pedicure and a Signature Nail System (SNS) manicure.

In response to such a status change of the STATUS field to NEW, at least one of the Hosts I-L, dependent upon which unique host identifiers are included with the user request message, receive notification from the cloud database 3010 that a field within the cloud database 3010 has changed and needs processing. In at least one embodiment, all of the Clients G-I and all of the Hosts I-L will receive notification that the status field as changed. The Clients G-I can read a unique client identifier from the CLIENTID field of the cloud database 3010 and can compared this read unique client identifier with a locally stored unique client identifier, respectively. Likewise, the Hosts I-L can read a unique host identifier from the HOSTID field of the cloud database 3010 and compare this read unique host identifier with a locally stored unique host identifier, respectively. The Clients G-I and Hosts I-L can drop all messages except those with a unique client identifier associated with the Clients G-I and Hosts I-L, respectively. For this example, Client G can do nothing since the user request message originated from Client G.

Any number of Hosts can accept a user request. In this example, Hosts I and K associated with "Allure Nail" and "Hot Stone Nail", respectively, transmit a communication "2" accepting the user request, that is Hosts I and K can transmit a user response message to the cloud database 3010 accepting the user request within the user request message. Accepting the user request indicates that the particular Host, e.g., Hosts I and K, are able to provide the service requested. As shown, the STATUS field for Hosts I and K changes to ACCEPT. The Client G can receive notification of this change. In at least one embodiment, the Client G can read the cloud database 3010 to determine that there are two Hosts, Hosts I and K in this example, that have accepted the user request.

Figure 5:
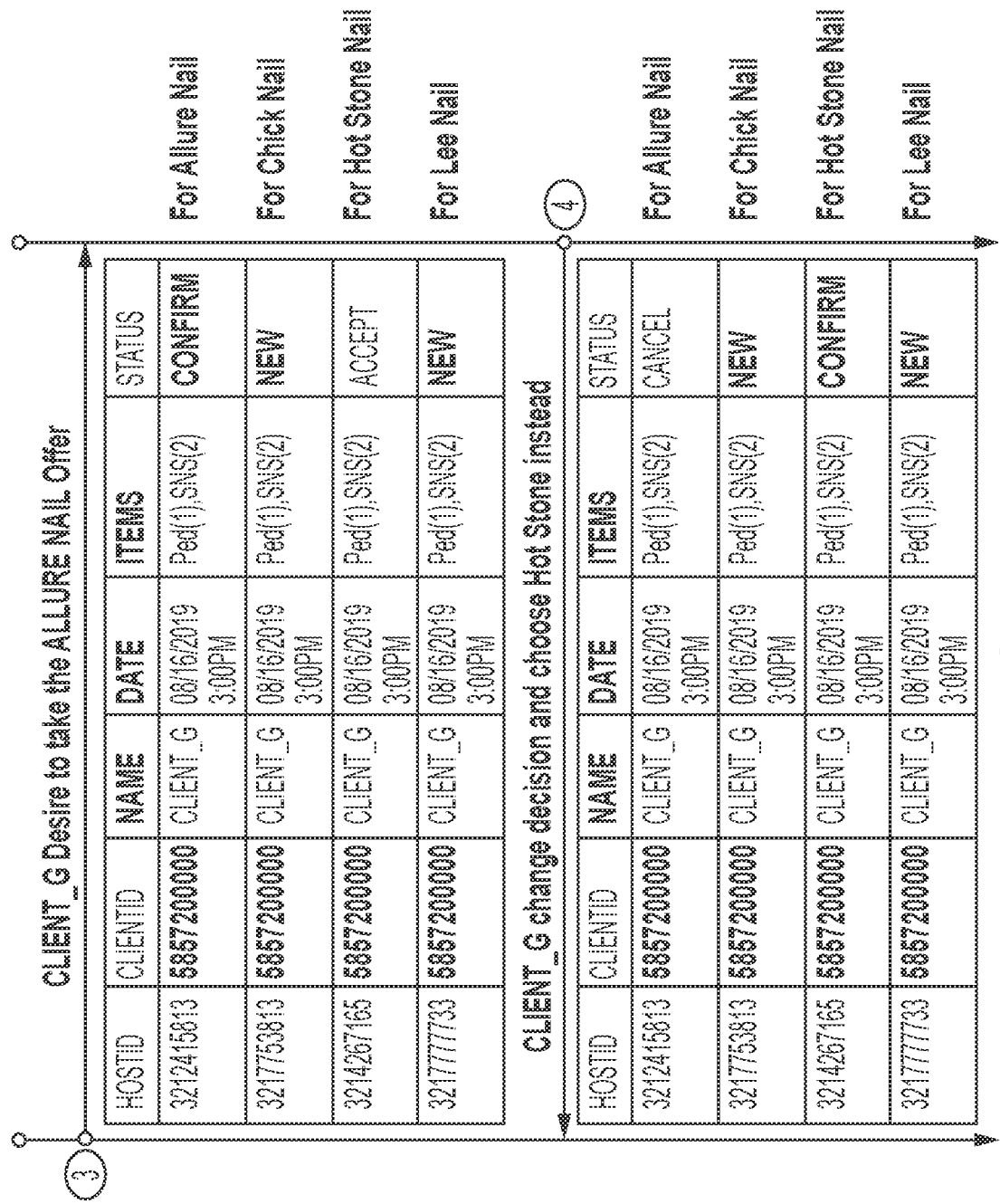
FIG. 5 illustrates example updated fields within the cloud database shown in FIG. 4, in accordance with at least one embodiment disclosed herein.

With reference to FIG. 5, example updated fields within the cloud database 3010 for a particular Client, e.g., Client G shown in FIG. 3, and particular Hosts, e.g., Hosts I-L shown in FIG. 3, are illustrated. For example, a user of the Client G can select which Host, e.g., "Allure Nail" in this example, the user would like to have their service with. The Client G can transmit a client status update to the cloud database 3010 to change Host I's ("Allure Nail") message status to CONFIRM within the STATUS field. In at least one embodiment, at any time if users of either of the Clients G-I or the Hosts I-L desires to cancel acceptance of the at least one product and service, the Clients G-I and the Hosts I-L can change the STATUS field to CANCEL. In this example, Client G can change their decision for a different Host and transmit another client status update to the cloud database 3010. In this example a cancellation request for Host I ("Allure Nail") that was previously confirmed with communication "3" is changed, with the STATUS field being changed to CANCEL for Host I. Client G can again transmit a client status update to cloud database 3010. In this example a confirmation for Host K ("Host Stone Nail") is changed, as shown the STATUS field for Host K being changed to "CONFIRM".

Figure 6:
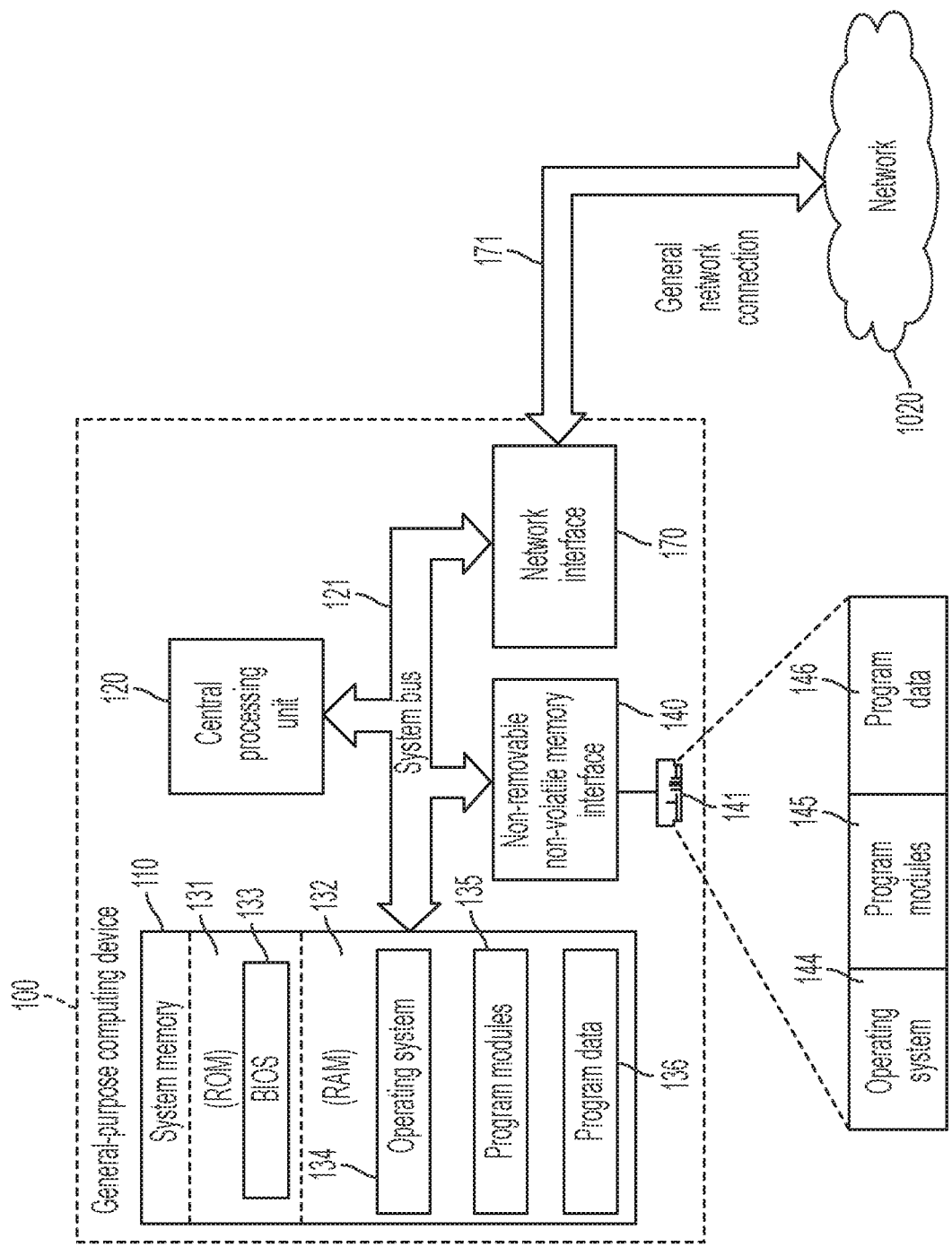
FIG. 6 illustrates an exemplary general-purpose computing device, in accordance with at least one embodiment disclosed herein.

With reference to FIG. 6, an exemplary general-purpose computing device is illustrated in the form of an exemplary general-purpose computing device 100. The general-purpose computing device 100 may be of the type utilized for the Clients A-I (FIGS. 1-3), the Hosts A-L (FIGS. 1-3), the SMS gateway 1020, the at least one email servers 1040, 2010, 2020, the at least one Internet search engine 1050, the cloud database 3010, as well as any other devices within the systems 1000, 2000, 3000. As such, it will be described with the understanding that variations can be made thereto. The exemplary general-purpose computing device 100 can include, but is not limited to, at least one central processing units (CPUs) 120, a system memory 110 and a system bus 121 that couples various system components including the system memory 110 to the CPU 120. The system bus 121 may be any of several types of bus structures including a memory bus or memory controller, a peripheral bus, and a local bus using any of a variety of bus architectures. Depending on the specific physical implementation, at least one of the CPUs 120, the system memory 110 and other components of the general-purpose computing device 100 can be physically co-located, such as on a single chip. In such a case, some or all of the system bus 121 can be nothing more than communicational pathways within a single chip structure and its illustration in FIG. 6 can be nothing more than notational convenience for the purpose of illustration.

The general-purpose computing device 100 also typically includes computer readable media, which can include any available media that can be accessed by computing device 100. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the general-purpose computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

When using communication media, the general-purpose computing device 100 may operate in a networked environment via logical connections to at least one remote computers. The logical connection depicted in FIG. 6 is a general network connection 171 to the communication network 1020, which can be a local area network (LAN), a wide area network (WAN) such as the Internet, or other networks. The computing device 100 is connected to the general network connection 171 through a transceiver, such as a network interface or adapter 170 that is, in turn, connected to the system bus 121. In a networked environment, program modules depicted relative to the general-purpose computing device 100, or portions or peripherals thereof, may be stored in the memory of at least one other computing devices that are communicatively coupled to the general-purpose computing device 100 through the general network connection 171. It will be appreciated that the network connections shown are exemplary and other means of establishing a communications link between computing devices may be used.

The general-purpose computing device 100 may also include other removable/non-removable, volatile/nonvolatile computer storage media. By way of example only, FIG. 6 illustrates a hard disk drive 141 that reads from or writes to non-removable, nonvolatile media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface, such as a non-removeable, non-volatile memory interface 140.

The drives and their associated computer storage media discussed above and illustrated in FIG. 6, provide storage of computer readable instructions, data structures, program modules and other data for the general-purpose computing device 100. In FIG. 6, for example, hard disk drive 141 is illustrated as storing operating system 144, other program modules 145, and program data 146. Note that these components can either be the same as or different from operating system 134, other program modules 135 and program data 136. Operating system 144, other program modules 145 and program data 146 are given different numbers here to illustrate that, at a minimum, they are different copies.

With reference to FIGS. 1-3, again, the foregoing description applies to the systems 1000, 2000, 3000, as well as to any other computing devices in communication with the systems 1000, 2000, 3000 through outside communication network 1020. The CPU 120 is coupled to the network interface 170. The network interface 170 facilitates outside communication in the form of voice and/or data. For example, the communication module may include a connection to a Plain Old Telephone Service (POTS) line, or a Voice-over-Internet Protocol (VOIP) line for voice communication. In addition, the network interface 170 may be configured to couple into an existing network, through wireless protocols (Bluetooth, 802.11a, ac, b, g, n, or the like) or through wired (Ethernet, or the like) connections, or through other more generic network connections. In still other configurations, a cellular link can be provided for both voice and data (i.e., GSM, CDMA or other, utilizing 2G, 3G, and/or 4G data structures and the like). The network interface 170 is not limited to any particular protocol or type of communication. It is, however, preferred that the network interface 170 be configured to transmit data bi-directionally, through at least one mode of communication. The more robust the structure of communication, the more manners in which to avoid a failure or a sabotage with respect to communication, such as to communicate an audio segment(s) in a timely manner.

The Clients A-C and Hosts A-D comprise a user interface which can configure the remote device 1010 and the other remote devices 1015a, 1015b, 1015c. In many instances, the Clients A-I and the Hosts A-L comprise a keypad, e.g., at least one of virtual and physical (not shown) and a display (not shown) that is connected through a wired connection with the central processing unit 120. Of course, with the different communication protocols associated with the network interface 170, the network interface 170 may comprise a wireless device that communicates with the communication network 1020 through a wireless communication protocol (i.e., Bluetooth, RF, WIFI, etc.). In other embodiments, the social networking platform 1012 may comprise a virtual programming module in the form of software that is on, for example, a smartphone, in communication with the network interface 170. In still other embodiments, such a virtual programming module may be located in the cloud (or web based), with access thereto through any number of different computing devices. Advantageously, with such a configuration, a user may be able to communicate with the social networking system 1000 remotely, with the ability to change functionality.

Figure 7:
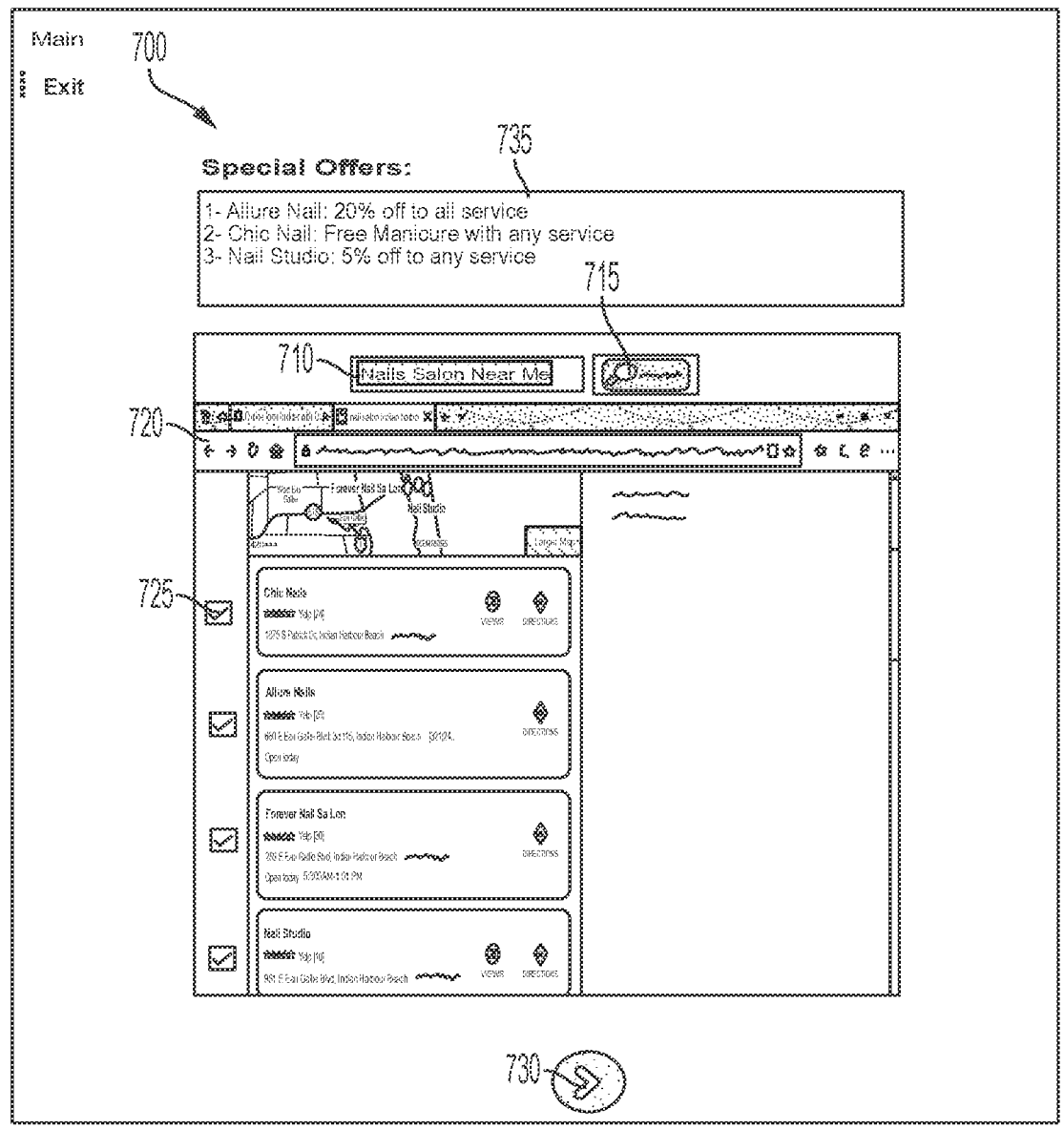
FIG. 7 illustrates an exemplary Graphical User Interface (GUI) utilized to search for and select businesses within a vicinity of a location, in accordance with at least one embodiment disclosed herein.

With reference to FIG. 7, an exemplary GUI 700 is illustrated for searching and selecting one or more businesses within a vicinity of a location of the Clients A-I. In this example, the GUI 700 is utilized for searching and selecting one or more businesses within a vicinity of a current location of any of the Clients A-I. The GUI 700 can be generated by the software applications 1001-1003, 2001-2003, 3001-3003, via the CPU 120. The GUI 700 can be displayed on a display of the Clients A-I. The GUI 700 can include an Internet search query box 710 in which users of the Clients A-I can enter a search query, respectively. In this example, a user of one of the Clients A-I enters "Nails Salon Near Me", as shown. The GUI 700 can further include a button 715 that triggers transmission of the search query to the at least one search engine 1050.

The GUI 700 can include a search result window 720. The search result window 720 shows a list of businesses that can provide at least one of products and services associated with the search query entered into the Internet search query box 710. In this example, the GUI 700 lists four businesses, "Chic Nails", "Allure Nails", "Forever Nail Sa Lon", and Nail Studio", along with other associated business identifiers, such as the shown address and phone number. In at least one embodiment, this list of businesses can be sorted based on customer ratings, such as a ranked list of nail salons based on customer ratings by customers of such nail salons. In addition, the search result window 715 can further include at least one selection box 725 next to each of the businesses listed. In this example, a user has selected to send a user request to four preferred nail salons, "Chic Nails", "Allure Nails", "Forever Nail Sa Lon", and "Nail Studio", with the user selecting the selection boxes next to each of these businesses. The GUI 700 can further include a button to move to a next GUI, such as button 730 shown at the bottom of the GUI 700.

In at least one embodiment, the GUI 700 can further include an advertising window 735 showing "Special Offers" for potential customers of the business displayed therein. The advertising window 735 can display advertisements for the business that are listed in the search result window 720. In this example, "Allure Nails" is advertising a "20% off to all service" discount should a user select to have a nail procedure performed there. Likewise, "Chick Nails" is advertising a "Free Manicure with any service" and "Nail Studio" is advertising "5% off any service". Such advertisements can be a source of revenue for an entity (e.g., company) that offers the services of the software applications 1004-1007, 2004-2007, 3004-3007 to the Hosts A-L, respectively. For example, such an entity can charge a monetary amount each time such advertisements are displayed on the Clients A-I. In at least one embodiment, such an entity can charge another monetary amount to have a business displayed at the top of the search results, featured as a "sponsored" business. Thus, the software applications 1004-1007, 2004-2007, 3004-3007 can be a source of revenue for an entity offering the services of the software applications 1004-1007, 2004-2007, 3004-3007 discussed herein.

Figure 8:
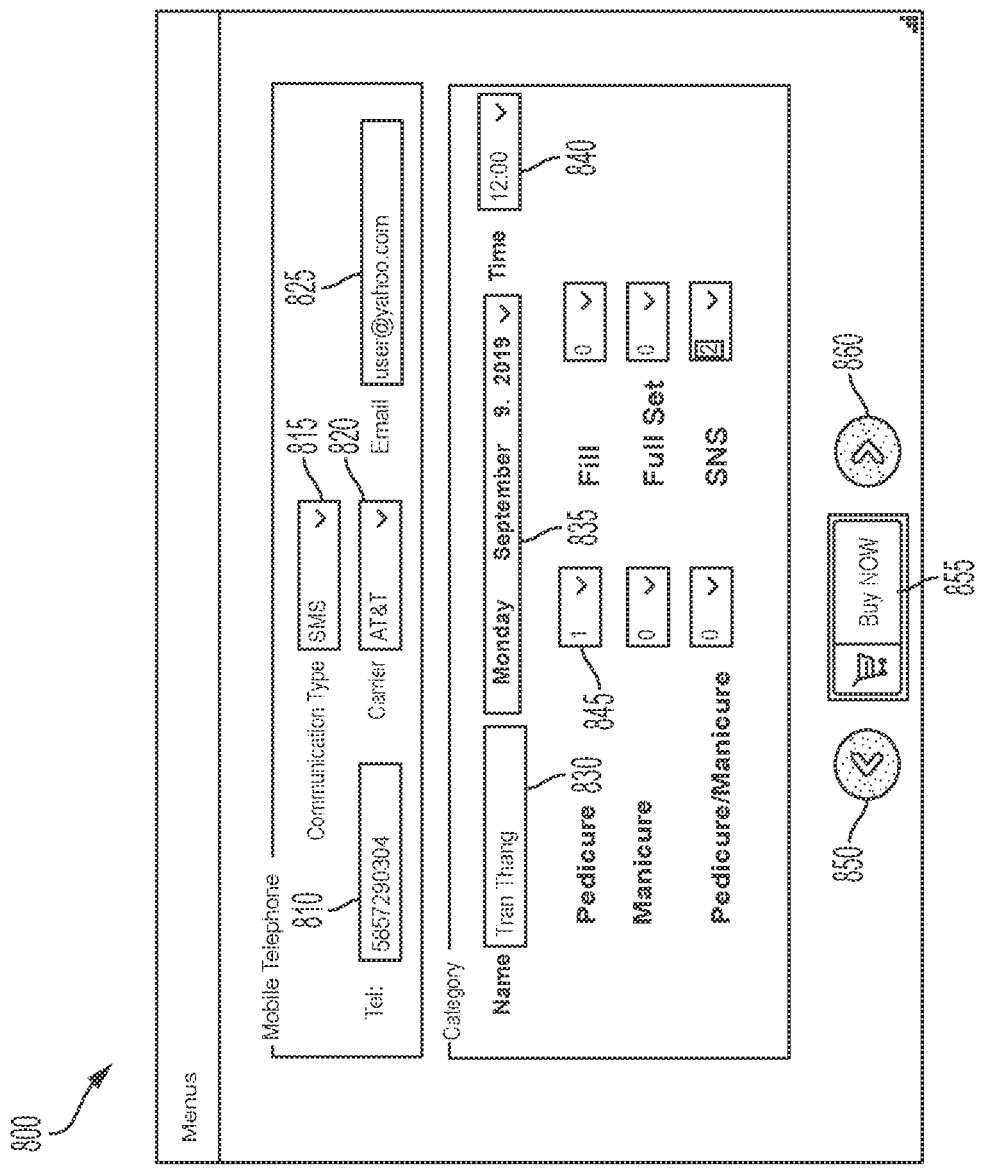
FIG. 8 illustrates an exemplary GUI for selecting at least one user request from a list of user requests, in accordance with at least one embodiment disclosed herein.

With reference to FIG. 8, an exemplary GUI 800 is illustrated for selecting at least one user request from a list of user requests. In this example, the GUI 800 can be generated by the software applications 1001-1003, 2001-2003, 3001-3003, via the CPU 120. The GUI 800 can be displayed on a display of the Clients A-I. The GUI 800 can include various boxes that provide various information associated with the Clients A-I. For example, a box 810 provides a unique telephone number associated with the Clients A-I, respectively. In this example, one of the Clients A-I is associated with the telephone number "5857290304", shown in box 810. The GUI 800 can further include a drop-down box, such as drop-down box 815 showing a communication type that is to be used to communicate with a Host, such as at least one of Hosts A-L. In this example, the drop-down box 815 illustrates that a user has selected to use SMS to communicate with at least one business, as described herein for the embodiments of FIG. 1. A user can also select to use email for the communication type, as described herein for the embodiments of FIG. 2 and the cloud database 3010 for the communication type, as described herein for the embodiments of FIG. 3.

The GUI 800 can further include another drop-down box, such as drop-down window 820 showing a wireless carrier associated with the mobile number shown in box 810. Should at least one of the Clients A-I have more than one wireless carrier available, a user can use the drop-down box 820 to select a particular wireless carrier from a list of wireless carriers. The GUI 800 can further include another box, such as box 825 that illustrates an email address that will be used to identify the Client to the Host, and associated with the telephone number illustrated in box 810.

The GUI 800 can further include a box 830 to identify a user "Tran Thang", a box 835 to identify a date this user would like to have a nail procedure performed, such as on "Monday, Sep. 9, 2019", and a box 840 to identify a time that this user would like to have a nail procedure performed, such as at "12:00". The GUI 800 can further include a list of procedures that are typically provided by nail salons. In this example, the GUI 800 can list various procedures, such as "Pedicure", "Manicure", "Pedicure/Manicure", "Fill", "Full Set", and "SNS", as user can request be sent to one or more selected business. Each of these procedures can have a drop-down box 845 displayed next to each of these procedures to allow a user to select a quantity desired for a particular procedure. The GUI 800 can further present a user with an option to return to a previous GUI, with button 850, to "Buy NOW" the desired procedure with button 855, and to transmit a user request formulated with GUI 800 to the businesses selected with GUI 700 with button 860.

Figure 9:
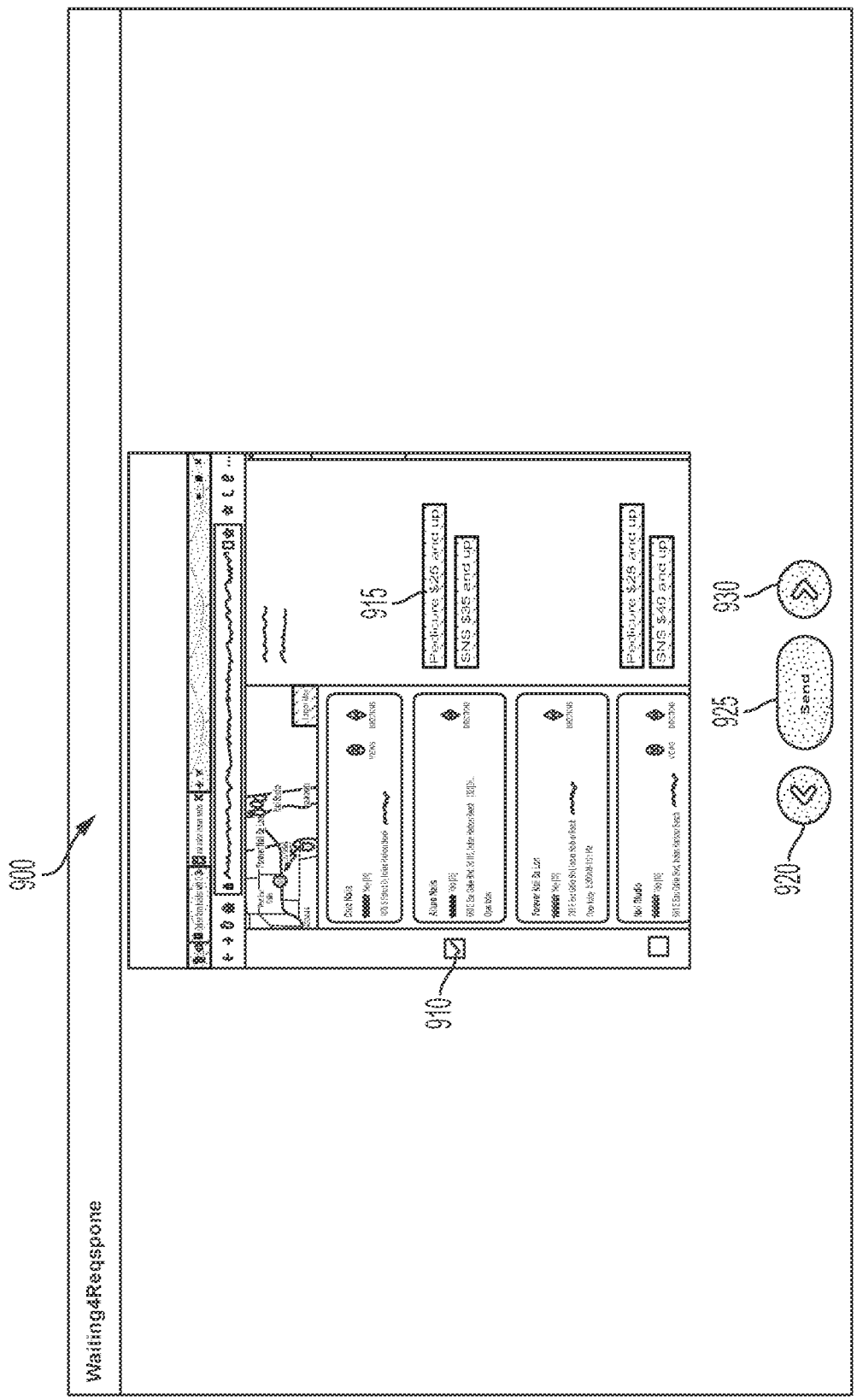
FIG. 9 illustrates an exemplary GUI for selecting a business that has provided a user response, in accordance with at least one embodiment disclosed herein.

With reference to FIG. 9, an exemplary GUI 900 is illustrated for selecting a business that has provided a user response. In this example, the GUI 800 can be generated by the software applications 1001-1003, 2001-2003, 3001-3003, via the CPU 120. The GUI 800 can be displayed on a display of the Clients A-I. In this example, the GUI 900 illustrates that two of the businesses selected with GUI 700 have responded to the user requests generated with GUI 800. For example, "Allure Nails" and "Nail Studio" are shown as having responded to one of the Clients A-I with a user response indicating "Pedicure $25 and up SNS $35 and up" and "Pedicure $28 and up SNS $40 and up", shown on GUI 900 with boxes 915. GUI 900 further illustrates that a user has selected to accept the offer for procedures from "Allure Nails" by selecting selection box 910. For example, the user can select to send this acceptance via button 925, or alternately the user can move to a next GUI via selection of button 930. In another alternative, the GUI 900 can provide the user with an option to select to return to a previous GUI, such as via selection of button 920.

With reference to FIG. 10, an exemplary GUI 1050 is illustrated for displaying information for the business selected on GUI 900. As shown on GUI 900, the user selected "Allure Nails" for the procedures selected on GUI 800. GUI 1050 can display a map 1055 of the vicinity of "Allure Nails", the address of "660 E Eau Gallie Blvd Ste 106, Indian Harbor Beach, Fla. 32937", and a phone number of "(312) 241-6325". The GUI 1050 can further display a time that this business is current open, showing "9:30 AM-7:00 PM". The GUI 1050 can further include a button 1060 to allow a user of any of the Clients A-I to obtain directions from their current location to this business. The GUI 1050 can provide the user with an option to select to return to a previous GUI, such as via selection of button 1065, provide a user with an option to cancel the procedure, such as via selection of button 1070, and an option to move to a next GUI, such as via button 1075.

Figure 11:
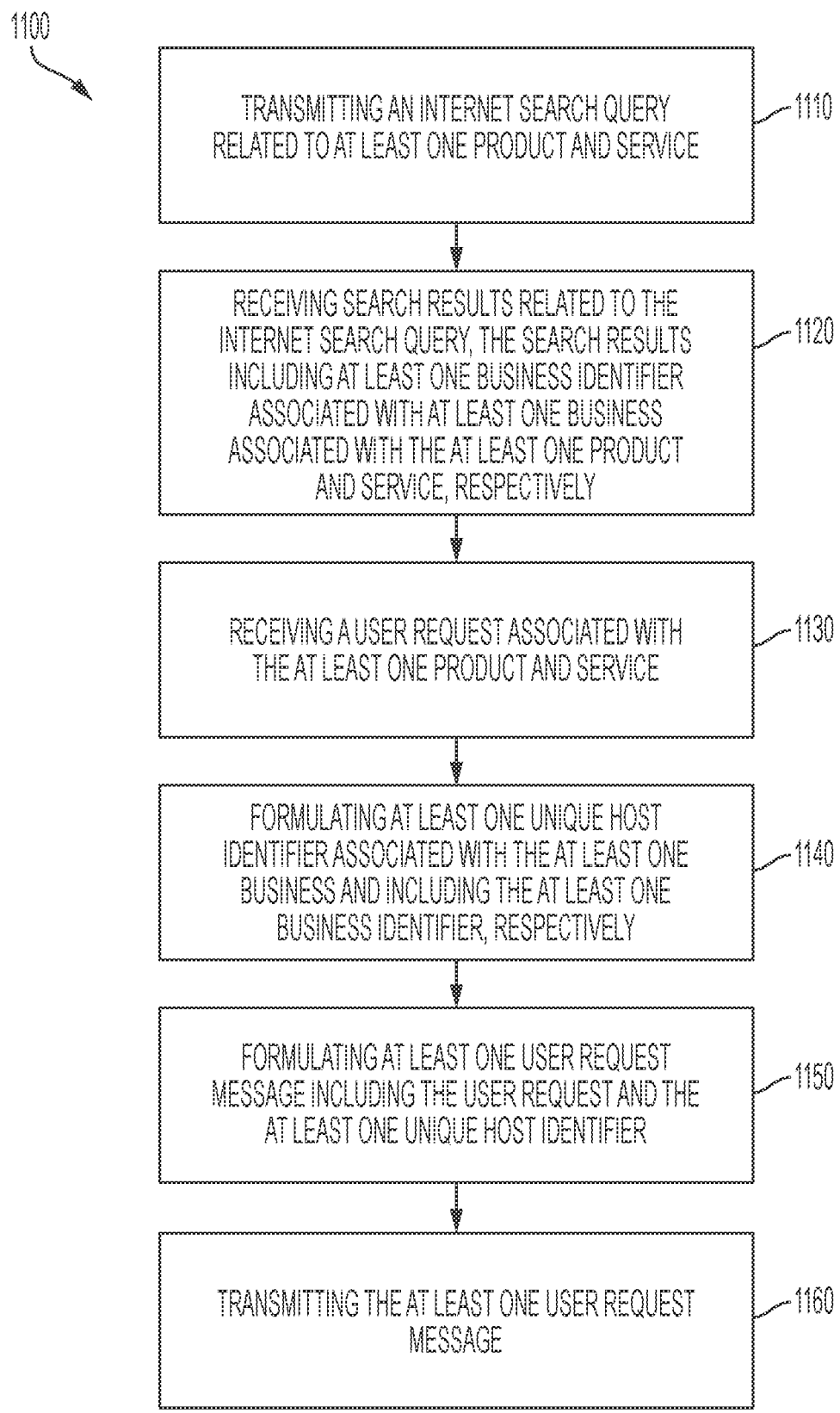
FIG. 11 illustrates a flowchart of an example method, in accordance with at least one embodiment disclosed herein.

With reference to FIG. 11, a flowchart is illustrated of an example method 1100 that can include various processes, such as processes 1100-1160. In particular, the method 1100 can begin with process 1110 which can include transmitting an Internet search query, such as by at least one of the Clients A-C, D-F, G-I. The Internet search query is, related to at least one product and service. In at least one embodiment, at least one of the software applications 1001-1003, 2001-2003, 3001-3003, via the CPU 120, executes the process 1110 and adapter 170 can perform this transmitting. Process 1110 can proceed to process 1120.

Process 1120 can include receiving search results related to the Internet search query of process 1100. The search results can include at least one business identifier associated with at least one business associated with the at least one product and service, respectively. In at least one embodiment, at least one of the software applications 1001-1003, 2001-2003, 3001-3003, via the CPU 120, executes the process 1120 and adapter 170 can perform this receiving. Process 1120 can proceed to process 1130.

Process 1130 can include receiving a user request associated with the at least one product and service. In at least one embodiment, at least one of the software applications 1001-1003, 2001-2003, 3001-3003, via the CPU 120, executes the process 1130 and the CPU 120 can perform this receiving. Process 1130 can proceed to process 1140.

Process 1140 can include formulating at least one unique host identifier associated with the at least one business and including the at least one business identifier (e.g., business name, business address, business phone number, etc.), respectively. For example, at least one of the Clients A-I can formulate at least one unique host identifier that is an email address including the at least one business identifier. This email address can include at least one of a business name, a business address, a business phone number, and a same domain associated with the at least one Host A-L. In at least one embodiment, at least one of the software applications 1001-1003, 2001-2003, 3001-3003, via the CPU 120, executes the process 1140 to perform the formulating. Process 1140 can proceed to process 1150.

Process 1150 can include formulating at least one user request message including the user request and the at least one unique host identifier. In at least one embodiment, at least one of the software applications 1001-1003, 2001-2003, 3001-3003, via the CPU 120, executes the process 1150 to perform the formulating. Process 1150 can proceed to process 1160.

Process 1160 can include transmitting the at least one user request message. In at least one embodiment, at least one of the software applications 1001-1003, 2001-2003, 3001-3003, via the adapter 170, executes the process 1160 to perform the transmitting. Although the method 1100 is described as including processes 1100-1160 as executed by at least one of the Clients A-C, D-F, G-I, in at least one embodiment the method 1100 can include any of the other processes described above as being performed by any of the devices in any of the systems 1000, 2000, 3000. For example, the method 1100 can further include any of the processes described above performed by at least one of the Hosts A-D. E-H, I-L, the SMS gateway 1020, the at least one email server 1040, the at least one search engine 1100, the at least one first email server 2010, the at least one email server 2020, the cloud database 3010, and any of the other devices within the systems 1000, 2000, 3000.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A method, comprising:
   transmitting, by a client device, an Internet search query related to at least one of a product and a service;
   receiving, by the client device, search results related to the Internet search query, the search results including at least one business identifier identifying at least one business associated with the at least one of the product and the service, respectively;
   receiving, by the client device, a user request associated with the at least one of the product and the service;
   formulating, by the client device, at least one unique host identifier associated with the at least one business and including the at least one business identifier, respectively;
   formulating, by the client device, at least one user request message including the user request and the at least one unique host identifier; and
   transmitting, from the client device, the at least one user request message to the at least one business via the at least one unique host identifier.

2. The method of claim 1, further comprising:
   formulating, by the client device, a unique client identifier associated with the client device;
   formulating, by the client device, the at least one user request message to further include the unique client identifier; and
   transmitting, from the client device, the at least one user request message further including the unique client identifier.

3. The method of claim 2, wherein the unique client identifier is an email address that includes a phone number associated with the client device and a domain associated with a wireless carrier servicing the client device.

4. The method of claim 2, wherein the at least one user request message is a Short Message Service (SMS) message, the method further comprising:
   receiving, by an SMS gateway, the at least one user request message;

formulating, by the SMS gateway, at least one host message including the user request and the unique client identifier; and transmitting, by the SMS gateway, the at least one host message to at least one host device, respectively, via the at least one unique host identifier.

5. The method of claim 2, further comprising:

receiving, by a particular host device, the user request and the unique client identifier;

receiving, by the particular host device, at least one user response associated with the user request;

formulating, by the particular host device, at least one response message including the at least one user response; and transmitting, by the particular host device, the at least one response message to the client device via the unique client identifier.

6. The method of claim 5, wherein the response message is an email response message.

7. The method of claim 6, further comprising:

receiving, by a Short Message Service (SMS) gateway, the email response message;

formulating, by the SMS gateway, an SMS response message including the user response; and transmitting, by the SMS gateway, the SMS response message to the client device via the unique client identifier.

8. The method of claim 1, further comprising:

accepting, by the client device, a client email address associated with the client device;

formulating, by the client device, the at least one user request message further including the client email address; and transmitting, from the client device, the at least one user request message further including the client email address.

9. The method of claim 8, further comprising:

receiving, by a particular host device, the user request and the client email address;

receiving, by the particular host device, at least one user response associated with the user request;

formulating, by the particular host device, at least one response message including the at least one user response; and transmitting, by the particular host device, the at least one response message to the client device via the client email address.

10. The method of claim 1, wherein the at least one user request message further includes a unique client identifier, the method further comprising:

receiving, by a cloud database, the at least one user request message including the unique client identifier and utilized to update a status field in the cloud database;

receiving, by the cloud database, a user response message utilized to update the status field in the cloud database;

receiving, by the cloud database, at least one user response message utilized to update the status field, the user response being associated with a particular host;

receiving, by the cloud database, a client status update utilized to update the status field, the client status update associated with the client device;

updating, by the cloud database, the status field in response to the cloud database receiving at least one of the at least one user request message, the at least one user response message, and the client status update, the status indicating one of a pending user request, an acceptance by the particular host of the user request, a confirmation of that the client device desires the user request, and a cancellation by the client device of the user request; and transmitting, by the cloud database, notification of any updates of the status field to the client device and at least one host device associated with the at least one unique host identifier, respectively.

11. The method of claim 10, wherein the cloud database is Google Firebase.

12. The method of claim 1, wherein the at least one unique host identifier is an email address that includes at least one of a business name, a business address, a business phone number, and a same domain associated with a plurality of the at least one host device.

13. A device, comprising:

a transceiver to transmit an Internet search query related to at least one of a product and a service, receive search results related to the Internet search query, the search results including at least one business identifier identifying at least one business associated with the at least one of the product and the service, respectively; and a processor to receive a user request associated with the at least one of the product and the service, formulate at least one unique host identifier associated with the at least one business and including the at least one business identifier, respectively, and formulate at least one user request message including the user request and the at least one unique host identifier; and wherein the transceiver further to transmit the at least one user request message to the at least one business via the at least one unique host identifier.

14. The device of claim 13, wherein:

the processor further to formulate a unique client identifier associated with the client device and formulate the at least one user request message to further include the unique client identifier; and the transceiver further to transmit the at least one user request message further including the unique client identifier.

15. The device of claim 14, wherein the unique client identifier is an email address that includes a phone number associated with the client device and a domain associated with a wireless carrier servicing the client device.

16. A system including the device of claim 14, wherein the at least one user request message is a Short Message Service (SMS) message, the system further comprising:

an SMS gateway to receive the at least one user request message, formulate at least one host message including the user request and the unique client identifier, and transmit the at least one host message to the at least one host device, respectively, via the at least one unique host identifier.

17. A system including the device of claim 14, further comprising a particular host device to receive the user request and the unique client identifier, receive at least one user response associated with the user request, formulate at least one response message including the at least one user response, and transmit the at least one response message to the client device via the unique client identifier.

18. The system of claim 17, wherein the response message is an email response message.

19. The system of claim 18, further comprising a Short Message Service (SMS) gateway to receive the email response message, to formulate an SMS response message including the user response, and transmit the SMS response message to the client device via the unique client identifier.

20. The device of claim 13, wherein the processor further accepts a client email address associated with the client device, formulates the at least one user request message further including the client email address, and the transceiver further transmits the at least one user request message further including the client email address.

21. A system including the device claim 20, further comprising
a particular host device to receive the user request and the client email address, receive at least one user response associated with the user request, formulate at least one response message including the at least one user response, and transmit, via client email address, the at least one response message to the client device via the client email address.

22. A system including the device of claim 13, wherein the at least one user request message further includes a unique client identifier, the system further comprising a cloud database to receive the at least one user request message including the unique client identifier and utilized to update a status field in the cloud database, receive a user response message utilized to update the status field in the cloud database, receive at least one user response message utilized to update the status field, the user response being associated with a particular host, receive a client status update utilized to update the status field, the client status update associated with the client device, update the status field in response to the cloud database receiving at least one of the at least one user request message, the at least one user response message, and the client status update, the status indicating one of a pending user request, an acceptance by the particular host of the user request, a confirmation of that the client device desires the user request, and a cancellation by the client device of the user request, and transmit notification of any updates of the status field to the client device and at least one host device associated with the at least one unique host identifier, respectively.

23. The system of claim 22, wherein the cloud database is Google Firebase.

24. The device of claim 13, wherein the at least one unique host identifier is an email address that includes at least one of a business name, a business address, a business phone number, and a same domain associated with a plurality of the at least one host device.

* * * * *